United States Patent [19]
Eiderman et al.

[11] Patent Number: 5,598,661
[45] Date of Patent: Feb. 4, 1997

[54] SOIL IRRIGATION SOLAR STILL SYSTEM

[75] Inventors: Boris Eiderman, Jerusalem; Alexander Lukatsky, Gush Etzion, both of Israel

[73] Assignee: The Israeli International Company for Investments "Hatchiya Ltd.", Jerusalem, Israel

[21] Appl. No.: 604,921

[22] Filed: Feb. 22, 1996

[51] Int. Cl.$^6$ .................................................. A01G 13/00
[52] U.S. Cl. ........................... 47/27; 159/903; 202/234; 203/10; 203/DIG. 1; 203/DIG. 17
[58] Field of Search ........................... 202/234; 203/10, 203/DIG. 1, DIG. 17; 159/903; 47/27

[56] References Cited

U.S. PATENT DOCUMENTS 5,067,272  11/1991  Constantz .............................. 47/27 C

FOREIGN PATENT DOCUMENTS 223796  2/1957  Australia ................................ 47/27
281877  1/1964  Australia ................................ 47/27

Primary Examiner—Henry E. Raduazo
Attorney, Agent, or Firm—Foley & Lardner

[57] ABSTRACT

The invention provides a soil irrigation solar still system of the type having a material transparent to solar radiation, supported in a non-planar, arched or sloped roof configuration above a darkened channel containing an impure liquid in such a manner as to allow radiant energy to heat and vaporize the impure water, to provide purified water for irrigation purposes, as the result of purified water which condenses on the underside of the transparent material due to the evaporation of the impure water in the channel rolling down along the underside of the transparent material, characterized in that the channel is suspended above an excavated area in the soil, the excavated area having side wall rims spaced apart from outer edges of the channel, forming an open chamber therearound, and the roof is provided with outer edges extending beyond and terminating adjacent the respective side wall rims of the open chamber, whereby a portion of the vaporized water circulates through the space between the side wall rims and the outer edges of the channel into the chamber, and is absorbed into the side walls of the chamber for condensation along the surface thereof and into the soil forming the same.

7 Claims, 2 Drawing Sheets

U.S. Patent        Feb. 4, 1997        Sheet 1 of 2        5,598,661

SOIL IRRIGATION SOLAR STILL SYSTEM

The present invention relates to a soil irrigation solar still system for use in areas where the available water requires purification for agricultural use.

More particularly, the invention provides a special type of solar still as part of a system which produces irrigation water and to feed the same to crops without incurring excessive evaporation losses.

Arid areas are often situated near a seashore, or have available brackish water unsuitable for agriculture. Many such areas are, however, abundantly supplied with solar energy, the heat of which can be used to purify water by evaporation and subsequent condensation. Devices operating accordingly are known as solar stills, and these have been known for well over a century. Most solar stills have been used to produce drinking water, due to the difficulties in producing low-cost water for other purposes.

High water cost is the result of dividing the interest paid on the capital needed to finance construction, plus operating and maintenance costs, by the value of the moderate output of even a well constructed still.

Daily yields from solar stills range from 2 liters/sq. Meter of water surface in winter, to 5 liters in summer; (Daniels, "Direct Use of the Sun's Energy", Yale, p. 174).

Howe reports similar results from a California installation producing one gallon per day per 10 sq. Ft. ("Solar Energy Research", Wisconsin Press, 1955, p. 107).

Given the high cost of water produced from any type of solar still, it becomes obvious that the low utilization factor of some types of irrigation systems, for example flood irrigation and air-spray irrigation, are irrigation methods which are quite unsuitable for use in combination with solar stills. Drip irrigation loses less water to evaporation, and a solar still, in combination with a type of drip irrigation, is indeed proposed by Raab in U.S. Pat. No. 4,698,135. Raab's system is, however, too complicated to provide a large collector area at the very low capital cost essential for agricultural applications. Raab is correct in pointing out that solar energy is free; but, as gold, its collection is expensive.

Further systems for the use of solar stills for agricultural applications are described in U.S. Pat. Nos. 3,653,150, 4,125,963, 4,141,798, 4,178,715 and 4,194,949.

In U.S. Pat. No. 5,067,272, Constantz discloses an apparatus for providing purified water to row crops which comprises a dark plastic lower sheeting layer upon which impaired water can be ponded, and a clear plastic upper sheet which is positioned above the lower layer in the shape of an inverted V by means of a suitable supporting structure. The apparatus is designed to be placed between two row crops in a field in need of irrigation, and irrigation takes place by filling the lower sheeting layer with impaired water which evaporates when solar energy is transmitted onto the lower layer through the clear upper sheet. The evaporated water collects on the underside of the clear plastic sheet and drips downward along the sheet until it contacts the ground in the vicinity of a crop row.

The described apparatus includes little more than the bare essentials for an operating solar still, and although no cost figures are provided by Constantz, his claim that his apparatus is inexpensive is indeed reasonable. The disadvantage thereof is that the produced water is deposited in a pair of lines, or very narrow and long rectangles, one at each side of the apparatus. The groundsoil in these lines will rapidly become saturated, and water will be lost by evaporation from these lines, at the expense of water entering the ground or being used by the crops.

It is therefore one of the objects of the present invention to obviate the disadvantage of the prior art solar stills for agricultural purposes, and to provide a still which combines moderate capital costs with an efficient system for delivering the produced water to the plants requiring the same. In particular, it is an object of the present invention to provide a water delivery system which achieves high efficiency by avoiding water losses due to soil surface evaporation.

The present invention achieves the above objectives by providing a soil irrigation solar still system of the type having a material transparent to solar radiation, supported in a non-planar, arched or sloped roof configuration above a darkened channel containing an impure liquid in such a manner as to allow radiant energy to heat and vaporize said impure water, to provide purified water for irrigation purposes, as the result of purified water which condenses on the underside of said transparent material due to the evaporation of said impure water in said channel rolling down. ,along the underside of said transparent material, characterized in that said channel is suspended above an excavated area in said soil, said excavated area having side wall rims spaced apart from outer edges of said channel, forming an open chamber there around, and said roof is provided with outer edges extending beyond and terminating adjacent said respective side wall rims of said open chamber, whereby a portion of said vaporized water circulates through said space between said side wall rims and said outer edges of said channel into said chamber, and is absorbed into the side walls of said chamber for condensation along the surface thereof and into the soil forming the same.

In a preferred embodiment of the present invention there is provided a soil irrigation solar still system in combination with a water-impermeable film, positioned in some areas of the soil adjacent said chamber between the surface of said soil and seeds planted therein. Condensed vaporized water absorbed from said chamber walls is detained below said film to reduce the rate at which said water is lost to surface evaporation and so to increase the water available to these seeds and the roots of the plants, e.g., crops, tress, etc., germinating therefrom.

In a most preferred embodiment of the present invention there is provided a soil irrigation solar still system, wherein said non-planar transparent roof material and said chamber together form a tunnel-like, moisture-retaining enclosure surrounding said channel, whereby a major portion of the vaporized water is absorbed into the adjacent soil in vapor form through the side walls of said chamber.

Yet further embodiments of the invention will be described hereinafter.

It will thus be realized that the novel system of the present invention has many advantages over the prior art systems.

First of all, since the rate of any reaction or interaction is only as fast as its slowest step, the prior art is limited by the rate of absorption of condensed water droplets in a relatively limited surface area, especially since in said prior art, systems the droplets are forced to follow each other to the same area of surface soil, which often becomes saturated. In contradistinction, the present invention provides an elongated chamber having much more surface area for water absorption.

Secondly, absorption of water from said chamber is not limited to, or solely dependent on, the formation of water droplets and the absorption thereof and, instead, the present invention provides, for the first time, a system which makes direct use of vapor formed by evaporation and circulates the same into said chamber for direct absorption into substantially horizontal soil side walls of said elongated chamber.

In addition, the actual rate of condensation will increase, since the temperature differential between the underground chamber side walls and the vapor is much greater than the temperature differential between the vapor and the transparent roof material, or even between the vapor and the ground surface upon which the prior art systems dripped.

Furthermore, it has, in fact, been found that the soil side walls of said chamber act to suck the water vapor from the chamber and system, thereby augmenting the reduction of moisture in the system and the increase in evaporation efficiency in accordance with Le Chatelier's principle.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
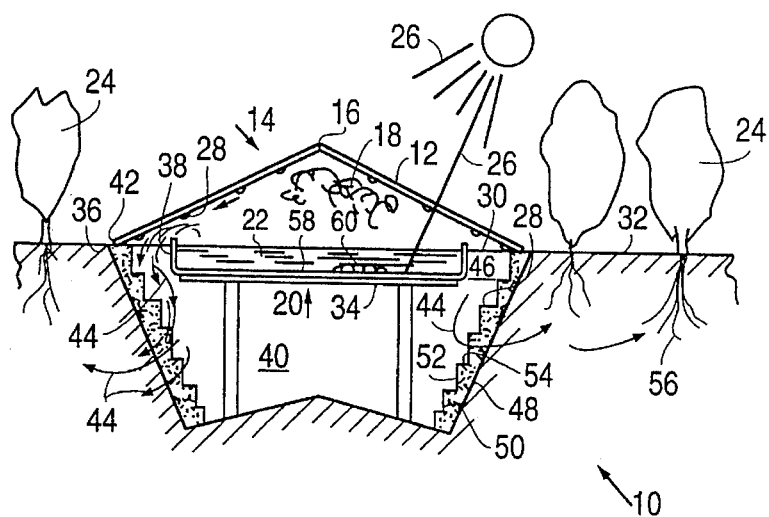
FIG. 1 is a diagramatic end view of a preferred embodiment of the soil irrigation solar irrigation solar still system according to the invention.

There is seen in FIG. 1 a soil irrigation solar still system 10. A material 12 transparent to solar radiation, such as glass or an acrylic sheet, is supported in an sloped roof 14 configuration, joints 16 being sealed to prevent loss of the hot moist air 18 produced under the roof 14. Obviously, as known in the prior art, the material can also be of supported plastic film. Preferably the roof 14 is provided with an inverted V shape, so that purified water becomes available at both sides of the still, although arched roofs (now shown) can also be used to achieve the same purpose. Positioned below the roof 14 are one or more darkened channels 20, each containing a shallow pool of impure water 22, such as sea-water or brackish water, which is injurious to plants 24 before its purification. Solar radiant energy 26 penetrates the roof 14 configuration, and heats and vaporizes the impure water 22. Purified water 28, due to natural cooling of the roof 14, condenses under the transparent material 12, and rolls down along the underside thereof, to provide purified water 28 for irrigation purposes. Arrangements as described so far are known in the prior art.

In the present invention, as shown in the figure, the channel 20 is supported above an excavated area 30 in the soil 32, preferably by spaced apart rails, as described hereinafter with reference to FIG. 5. Advantageously, the excavated area 30 has a depth of at least 5 cm below a bottom surface 34 of channel 20. The excavated area 30 has side wall rims 36 spaced apart from outer edges 38 of the channel 20, forming an open chamber 40 there around. The sloped roof 14 is provided with outer edges 42 extending beyond and terminating adjacent the respective side wall rims 36 of the open chamber 40.

A portion of the vaporized water 44 circulates through the space 46 between the side wall rims 36 and the outer edges 38 into the chamber 40, driven by the constant evaporation of further water from channel 20, and is absorbed in vapor form into the side walls 48 of the chamber 40.

Side walls 48 may be advantageously faced with a porous water and vapor absorbing material 50 such as cloth, wood waste or other sponge-like material, which absorbs, stores, distributes and transfers moisture to side walls 48, although the soil surface of the side walls itself has been found effective to achieving this effect without further augmentary means. In the embodiment shown, the absorbing material 50 surface facing the centre of chamber 40 is provided with a stepped, extended area surface 52 to further facilitate moisture absorption.

Condensation takes place along the extended area surface 52, and water accumulating on the horizontal ledges 54 thereof is well absorbed and enters the soil 32 via side walls 48. Subsequently, purified water 28 reaches the plant roots 56 due to the natural permeability of the soil 32.

Purified water 28 which has already been condensed also drips onto the ledges 54 for absorption into the stepped side water 52. The channel 20 holding the impure water 22 can be suitably darkened by a black plastic lining 58 positioned in the channel 20. Should the lining 58 become white as a result of salts 60 deposited thereon, it can be discarded together with deposited salts 60 and replaced.

With reference to the rest of the figures, similar reference numerals have been used to identify similar parts.

Figure 2:
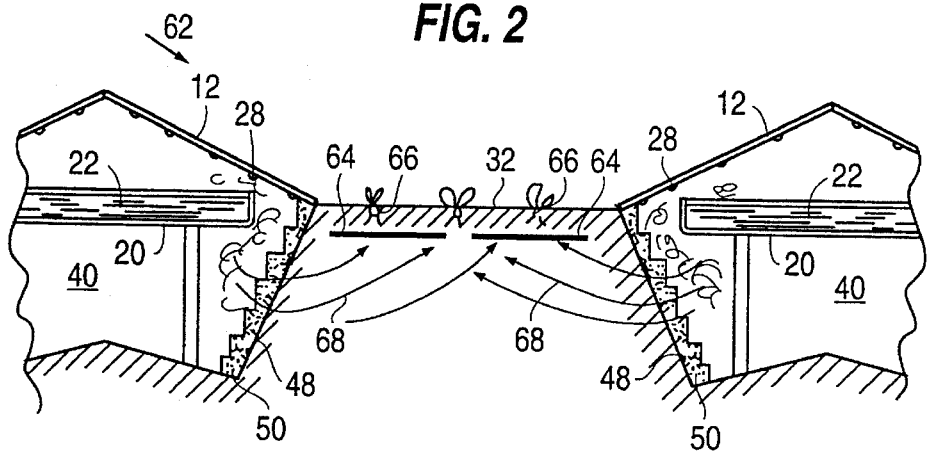
FIG. 2 is a diagramatic end view of an embodiment of the soil irrigation solar still system, wherein a water-impermeable film is positioned in some areas of the adjacent soil.

Referring now to FIG. 2, there is seen a soil irrigation solar still system 62, wherein the solar still is identical to that shown in FIG. 1. In this preferred embodiment, a water-impermeable film 64 is positioned in some areas of the soil 32 adjacent to the chamber 40, below the surface of the soil 32 and above seeds 66 planted therein. Thereby, condensed vaporized water 68 absorbed from chamber side walls 48 is detained below the film 64 to reduce the rate at which water 68 rises towards the surface to be lost to surface evaporation.

The solar still produces water during the day, but as is known, night irrigation is advantageous due to reduced soil and plant surface evaporation losses. The film 64 thus serves to delay vertical migration of part of the water 68, which then becomes available for night-time use. Film 64 is also used in those areas where, for whatever reason, no crops are presently being grown. The result is to increase the water available to the seeds 66 and the roots of plants germinating therefrom, and to extend the irrigation period for more complete water utilization by the crops being grown. During periods of rainfall, the film 64 serves to retain water thereabove, preventing fast downward drainage and therefore giving the crop more time to absorb moisture.

Figure 3:
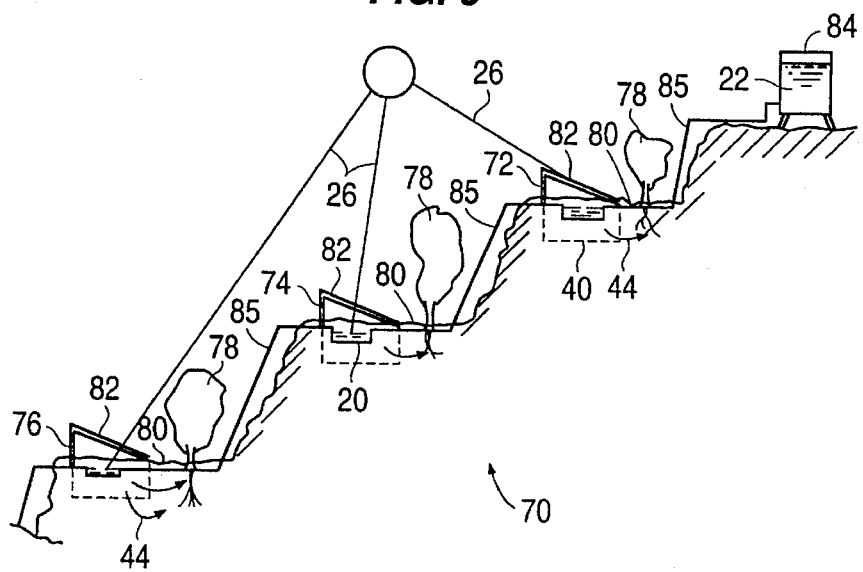
FIG. 3 is a diagramatic end view of an embodiment of a system comprising an array of solar stills, alternately arranged between rows of row crops.

FIG. 3 illustrates a soil irrigation solar still system 70, comprising an array of solar stills 72, 74, 76, alternately arranged between rows of row crops 78. In the embodiment shown, crops 78 are grown on hillside terraces 80, and each still 72-76 has a single sheet of transparent roofing 82 sloped down in the direction of the adjacent crops 78. A source of impure water 22, such as a tank 84 or pump (not shown), supplies the highest still 72, which in turn supplies lower stills 74, 76 with impure water 22, using pipelines 85.

Figure 4:
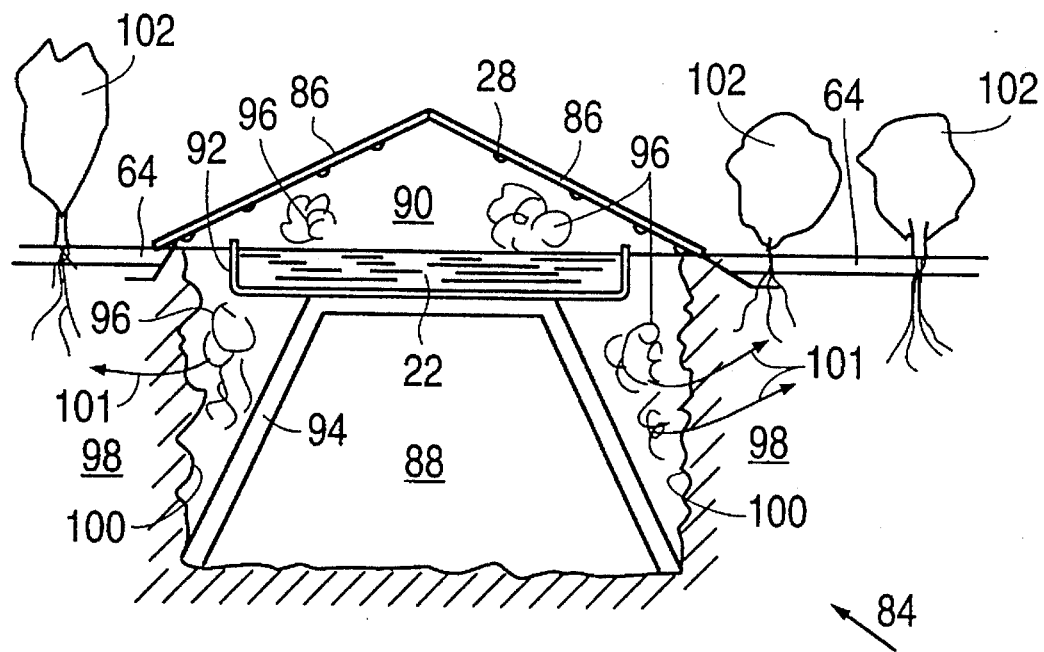
FIG. 4 is a diagramatic end view of an embodiment of the system, wherein a major portion of the vaporized water is absorbed into the adjacent soil in vapor form.

Seen in FIG. 4 is a soil irrigation solar still system 84, wherein the sloped roof transparent material 86 and the excavated chamber 88 together form a tunnel-like, moisture-retaining enclosure 90 surrounding the channel 92, supported on structure 94. A major portion of the vaporized water 96 is absorbed into the adjacent soil 98 in vapor form through the side walls 100 of the chamber 88. Side walls 100 are left with an uneven rough surface to improve vapor absorption, and side wall area is further extended for the same reason, by excavating the chamber 88 to a depth equivalent to between 0.6–1.0 times the width of channel 92. Transparent material 86 extends below the water impermeable film 84, thereby assuring retention of moisture in the soil.

As the output of solar stills is often limited in hot climates by the ability of the transparent roof to remain sufficiently cool to effect condensation of all the water vapor being produced, the present embodiment provides a suitable solution. Depending on soil temperature, the moisture 101 moving from the chamber 88 to the crop rows 102 either remains in its vapor phase or condenses. In either case, the moisture 101 migrates towards the crop row 102 without suffering substantial surface evaporation losses.

Figure 5:
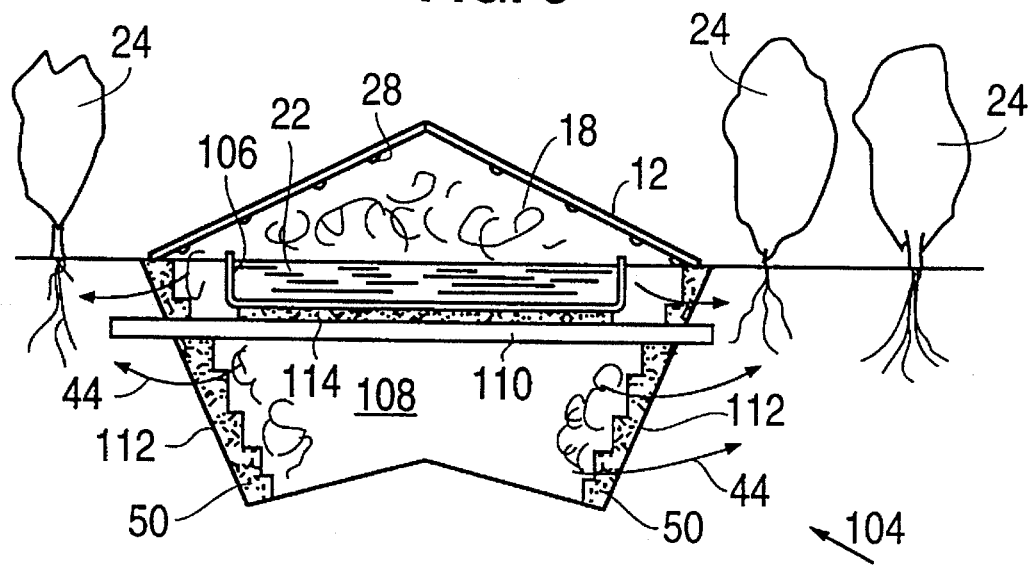
FIG. 5 is a diagramatic end view of an embodiment, wherein the channel is suspended above the chamber by support rails.

Referring now to FIG. 5, there is depicted a soil irrigation solar still system 104, wherein the channel 106 is suspended above the excavated chamber 108 by spaced-apart support rails 110, only one of which is shown, extending from the sides 112 of the chamber 108. Such spaced-apart support reduces costs where the evacuated chamber 108 is deep and maximizes the area of vapor passage to the chamber. Heat insulation 114 can be provided under the channel 106 to reduce heat losses from the impure water 22 and to serve to increase the evaporation rate therefrom.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A soil irrigation solar still system of the type having a material transparent to solar radiation, supported in a non-planar, arched or sloped roof configuration above a darkened channel containing an impure liquid in such a manner as to allow radiant energy to heat and vaporize said impure water, to provide purified water for irrigation purposes, as the result of purified water which condenses on the underside of said transparent material due to the evaporation of said impure water in said channel rolling down along the underside of said transparent material, characterized in that said channel is suspended above an excavated area in said soil, said excavated area having side wall rims spaced apart from outer edges of said channel, forming an open chamber there around, and said roof is provided with outer edges extending beyond and terminating adjacent said respective side wall rims of said open chamber, whereby a portion of said vaporized water circulates through said space between said side wall rims and said outer edges of said channel into said chamber, and is absorbed into the side walls of said chamber for condensation along the surface thereof and into the soil forming the same.

2. A soil irrigation solar still system according to claim 1, wherein said excavated area has a depth of at least 5 cm below a bottom surface of said channel.

3. A soil irrigation solar still system according to claim 1, wherein said roof is provided with an inverted V or U shape.

4. A soil irrigation solar still system according to claim 1, in combination with a water impermeable film, positioned in areas of said soil adjacent to said chamber between the surface of said soil and seeds planted therein, whereby condensed vaporized water absorbed from said chamber walls is detained below said film to reduce the rate at which said water is lost to surface evaporation and so to increase the time water is available to said seeds and the roots of plants germinating therefrom.

5. A soil irrigation solar still system, comprising an array of a plurality of solar stills according to claim 1, alternatively arranged between rows of row crops.

6. A soil irrigation solar still system according to claim 1, wherein said non-planar sloped or curved transparent roof material and said chamber together form a tunnel-like moisture-retaining enclosure surrounding said channel, whereby a major portion of said vaporized water is absorbed into the adjacent soil in vapor form through the side walls of said chamber.

7. A soil irrigation solar still system according to claim 1, wherein said channel is suspended above said chamber by support rails extending from the sides of said chamber.

* * * * *